US009648209B2

(12) United States Patent
Sugiyama

(10) Patent No.: US 9,648,209 B2
(45) Date of Patent: May 9, 2017

(54) INFORMATION PROCESSING APPARATUS, IMAGE FORMING SYSTEM, AND COMPUTER-READABLE MEDIUM THEREFOR

(71) Applicant: BROTHER KOGYO KABUSHIKI KAISHA, Nagoya, Aichi (JP)

(72) Inventor: Takashi Sugiyama, Okazaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/870,197

(22) Filed: Sep. 30, 2015

(65) Prior Publication Data
US 2016/0105587 A1    Apr. 14, 2016

(30) Foreign Application Priority Data
Oct. 14, 2014    (JP) .................................. 2014-210095

(51) Int. Cl.
*G06K 15/00*    (2006.01)
*H04N 1/44*    (2006.01)
(Continued)

(52) U.S. Cl.
CPC ......... *H04N 1/4413* (2013.01); *G06F 3/1222* (2013.01); *G06F 3/1238* (2013.01);
(Continued)

(58) Field of Classification Search
USPC ...................................................... 358/1.14
See application file for complete search history.

(56) References Cited

U.S. PATENT DOCUMENTS

2008/0113235 A1    5/2008    Terada et al.
2009/0210927 A1*   8/2009    Mokuya ............... H04L 9/3226
                                              726/3
(Continued)

FOREIGN PATENT DOCUMENTS

JP    2006-239944 A    9/2006
JP    2006-247888 A    9/2006
(Continued)

*Primary Examiner* — Jerome Grant, II
(74) *Attorney, Agent, or Firm* — Scully, Scott, Murphy & Presser, PC

(57) ABSTRACT

An information processing apparatus including a controller configured to accept image data identification information, an image forming instruction, and first user information, store the image data identification information, the image forming instruction, and the first user information, in response to acceptance of the image data identification information, the image forming instruction, and the first user information, transmit a reply request to an image forming apparatus, the reply request requesting the image forming apparatus to return second user information to the information processing apparatus, after transmission of the reply request, in response to receipt of the second user information, determine whether the first user information is in a particular relationship with the second user information, when determining that the first user information is in the particular relationship with the second user information, transmit image data identified by the image data identification information to the image forming apparatus.

21 Claims, 11 Drawing Sheets

(51) Int. Cl.
*H04N 1/00* (2006.01)
*G06F 3/12* (2006.01)

(52) U.S. Cl.
CPC ....... *G06F 3/1285* (2013.01); *H04N 1/00204* (2013.01); *H04N 2201/0094* (2013.01)

(56) References Cited

U.S. PATENT DOCUMENTS

| | | | |
|---|---|---|---|
| 2010/0265531 | A1 | 10/2010 | Nitta |
| 2011/0302637 | A1* | 12/2011 | Hamada ................ G06F 3/1204 726/5 |
| 2014/0211239 | A1* | 7/2014 | Onishi ............... H04N 1/00885 358/1.14 |
| 2016/0019013 | A1* | 1/2016 | Ido ........................ G06F 3/1286 358/1.15 |
| 2016/0092149 | A1* | 3/2016 | Nojima ................ G06F 3/1292 358/1.15 |

FOREIGN PATENT DOCUMENTS

| | | |
|---|---|---|
| JP | 2006-293933 A | 10/2006 |
| JP | 2006-334873 A | 12/2006 |
| JP | 2008-123774 A | 5/2008 |
| JP | 2010-250631 A | 11/2010 |
| JP | 2012-159950 A | 8/2012 |

\* cited by examiner

| JOB NAME | USER NAME | PRINT INSTRUCTION TIME |
|---|---|---|
| PRINT JOB 1 | USER A | X (Month): X (Day): X (Hour): X (Minute) |
| PRINT JOB 2 | USER A | X (Month): X (Day): X (Hour): X (Minute) |
| PRINT JOB 3 | USER A | X (Month): X (Day): X (Hour): X (Minute) |
| | | |
| | CANCEL | END |

INFORMATION PROCESSING APPARATUS, IMAGE FORMING SYSTEM, AND COMPUTER-READABLE MEDIUM THEREFOR

CROSS-REFERENCE TO RELATED APPLICATION

This application claims priority under 35 U.S.C. §119 from Japanese Patent Application No. 2014-210095 filed on Oct. 14, 2014. The entire subject matter of the application is incorporated herein by reference.

BACKGROUND

Technical Field

The following description relates to an information processing apparatus, an image forming system including the information processing apparatus and an image forming apparatus, and a non-transitory computer-readable medium storing computer-readable instructions for controlling the information processing apparatus.

Related Art

An image forming system has been known that includes an information processing apparatus and an image forming apparatus. In the image forming system, the information processing apparatus is configured to, in response to acceptance of an image forming instruction, transmit image data corresponding to the image forming instruction. The image forming apparatus is configured to receive the image data from the information processing apparatus and perform an image forming operation based on the received image data. The information processing apparatus is further configured to generate, as well as the image data, a job ticket containing coded information such as a name of a host device, a user ID, and an authentication password, and be on standby after transmitting only the job ticket to the image forming apparatus. The image forming apparatus includes an operation panel. The image forming apparatus performs user authentication based on whether a user ID input through the operation panel is coincident with the user ID contained in the received job ticket. When the user authentication is successfully performed, the image forming apparatus transmits to the information processing apparatus a request for transmission of the image data. In response to receipt of the request for transmission of the image data, the information processing apparatus transmits the image data to the image forming apparatus. The image forming apparatus performs an image forming operation based on the received image data.

According to the known image forming system, even though a user inputs the image forming instruction at the side of the information processing apparatus, unless the user moves to an installation location where the image forming apparatus is installed and inputs the user ID through the operation panel of the image forming apparatus, the image forming apparatus is not allowed to perform the image forming operation. Therefore, it is possible to achieve a higher level of security, for instance, by preventing an image formed by the image forming apparatus from being seen by a third party before the user reaches the installation location of the image forming apparatus. Further, unless the user authentication based on the job ticket is successfully performed, the image data is not transmitted from the information processing apparatus to the image forming apparatus. Therefore, it is possible to achieve a shorter period of time during which the image data occupies a particular space of a memory of the image forming apparatus, than when the image data is transmitted from the information processing apparatus to the image forming apparatus at a point of time when the information processing apparatus accepts the image forming instruction.

SUMMARY

However, in the known system, the user authentication is required to be performed at the side of the image forming apparatus. Hence, for instance, it might cause inconveniences such as a larger processing load placed on the image forming apparatus and a more complicated configuration of the image forming apparatus.

Aspects of the present disclosure are advantageous to provide one or more improved techniques that make it possible to solve at least a part of the aforementioned problems.

According to aspects of the present disclosure, an information processing apparatus is provided, which includes an operation unit, a storage, a communication unit configured to communicate with an image forming apparatus, and a controller configured to accept, via the operation unit, image data identification information, an image forming instruction, and first user information, the image data identification information identifying image data to be image-formed, the image forming instruction being an instruction to cause the image forming apparatus to perform an image forming operation based on the image data, store, into the storage, the image data identification information, the image forming instruction, and the first user information, in response to acceptance of the image data identification information, the image forming instruction, and the first user information, transmit a reply request to the image forming apparatus via the communication unit, the reply request requesting the image forming apparatus to return second user information to the information processing apparatus, the second user information being returned to the information processing apparatus after a user identified by the second user information successfully logs in to the image forming apparatus, after transmission of the reply request, in response to receipt of the second user information returned by the image forming apparatus, determine whether the first user information stored in the storage is in a particular relationship with the second user information returned by the image forming apparatus, after receipt of the second user information returned by the image forming apparatus, when determining that the first user information is in the particular relationship with the second user information, transmit the image data identified by the image data identification information to the image forming apparatus via the communication unit, and when determining that the first user information is not in the particular relationship with the second user information, not transmit the image data identified by the image data identification information to the image forming apparatus via the communication unit.

According to aspects of the present disclosure, further provided is an image forming system including an information processing apparatus, and an image forming apparatus, the information processing apparatus including an operation unit, a storage, a communication unit configured to communicate with an image forming apparatus, and a controller configured to accept, via the operation unit, image data identification information, an image forming instruction, and first user information, the image data identification information identifying image data to be image-formed, the image forming instruction being an instruction to cause the image forming apparatus to perform an image forming operation based on the image data, store, into the storage, the image data identification information, the image forming instruction, and the first user information, in response to acceptance of the image data identification information, the image forming instruction, and the first user information, transmit a reply request to the image forming apparatus via the communication unit, the reply request requesting the image forming apparatus to return second user information to the information processing apparatus, the second user information being returned to the information processing apparatus after a user identified by the second user information successfully logs in to the image forming apparatus, after transmission of the reply request, in response to receipt of the second user information returned by the image forming apparatus, determine whether the first user information stored in the storage is in a particular relationship with the second user information returned by the image forming apparatus, after receipt of the second user information returned by the image forming apparatus, when determining that the first user information is in the particular relationship with the second user information, transmit the image data identified by the image data identification information to the image forming apparatus via the communication unit, and when determining that the first user information is not in the particular relationship with the second user information, not transmit the image data identified by the image data identification information to the image forming apparatus via the communication unit, the image forming apparatus including an image forming unit, an image-forming-apparatus-side communication unit, an image-forming-apparatus-side operation unit, and an image-forming-apparatus-side controller configured to, in response to receiving the reply request via the image-forming-apparatus-side communication unit, return the second user information accepted via the image-forming-apparatus-side operation unit, to the information processing apparatus via the image-forming-apparatus-side communication unit, when receiving the image data that corresponds to the second user information returned in response to the reply request, via the image-forming-apparatus-side communication unit, control the image forming unit to perform the image forming operation based on the received image data, and when receiving the image data that does not correspond to the second user information returned in response to the reply request, via the image-forming-apparatus-side communication unit, control the image forming unit not to perform the image forming operation based on the received image data.

According to aspects of the present disclosure, further provided is a non-transitory computer-readable medium storing computer-readable instructions that are executable by one or more processors coupled with an information processing apparatus, the information processing apparatus including an operation unit, a storage, and a communication unit configured to communicate with an image forming apparatus, the instructions being configured to, when executed by the one or more processors, cause the one or more processors to accept, via the operation unit, image data identification information, an image forming instruction, and first user information, the image data identification information identifying image data to be image-formed, the image forming instruction being an instruction to cause the image forming apparatus to perform an image forming operation based on the image data, store, into the storage, the image data identification information, the image forming instruction, and the first user information, in response to acceptance of the image data identification information, the image forming instruction, and the first user information, transmit a reply request to the image forming apparatus via the communication unit, the reply request requesting the image forming apparatus to return second user information to the information processing apparatus, the second user information being returned to the information processing apparatus after a user identified by the second user information successfully logs in to the image forming apparatus, after transmission of the reply request, in response to receipt of the second user information returned by the image forming apparatus, determine whether the first user information stored in the storage is in a particular relationship with the second user information returned by the image forming apparatus, after receipt of the second user information returned by the image forming apparatus, when determining that the first user information is in the particular relationship with the second user information, transmit the image data identified by the image data identification information to the image forming apparatus via the communication unit, and when determining that the first user information is not in the particular relationship with the second user information, not transmit the image data identified by the image data identification information to the image forming apparatus via the communication unit.

BRIEF DESCRIPTION OF THE ACCOMPANYING DRAWINGS

Figures 5, 6:
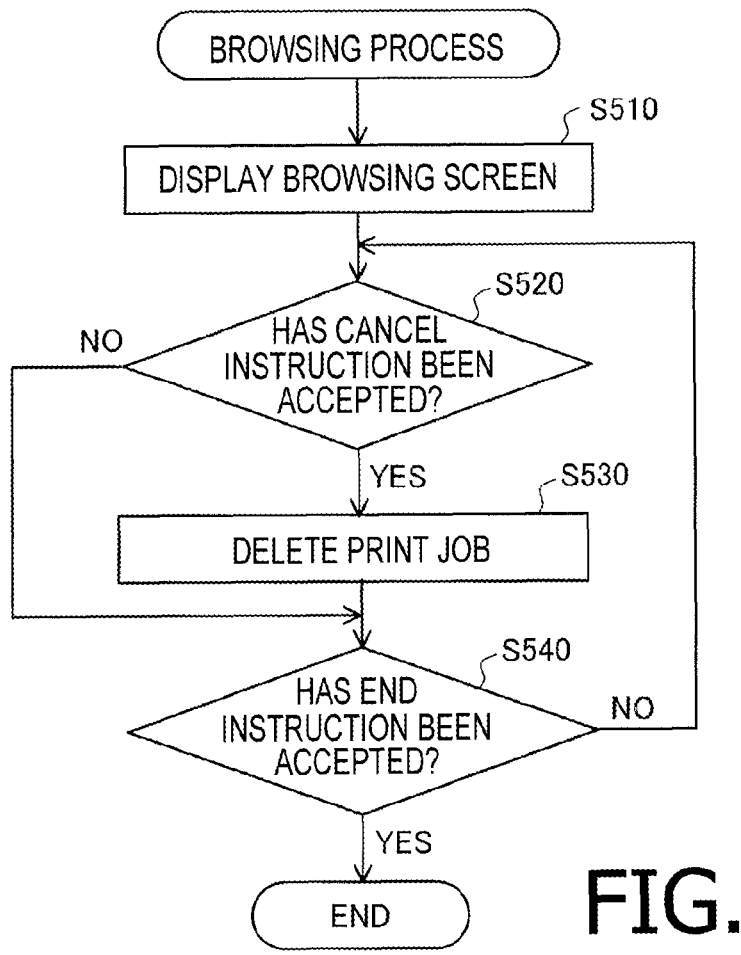
FIG. 5 is a flowchart showing a procedure of a browsing process to be executed by the first CPU in the first illustrative embodiment according to one or more aspects of the present disclosure.

FIG. 6 schematically exemplifies a browsing screen to be displayed in the browsing process in the first illustrative embodiment according to one or more aspects of the present disclosure.

Figure 7:
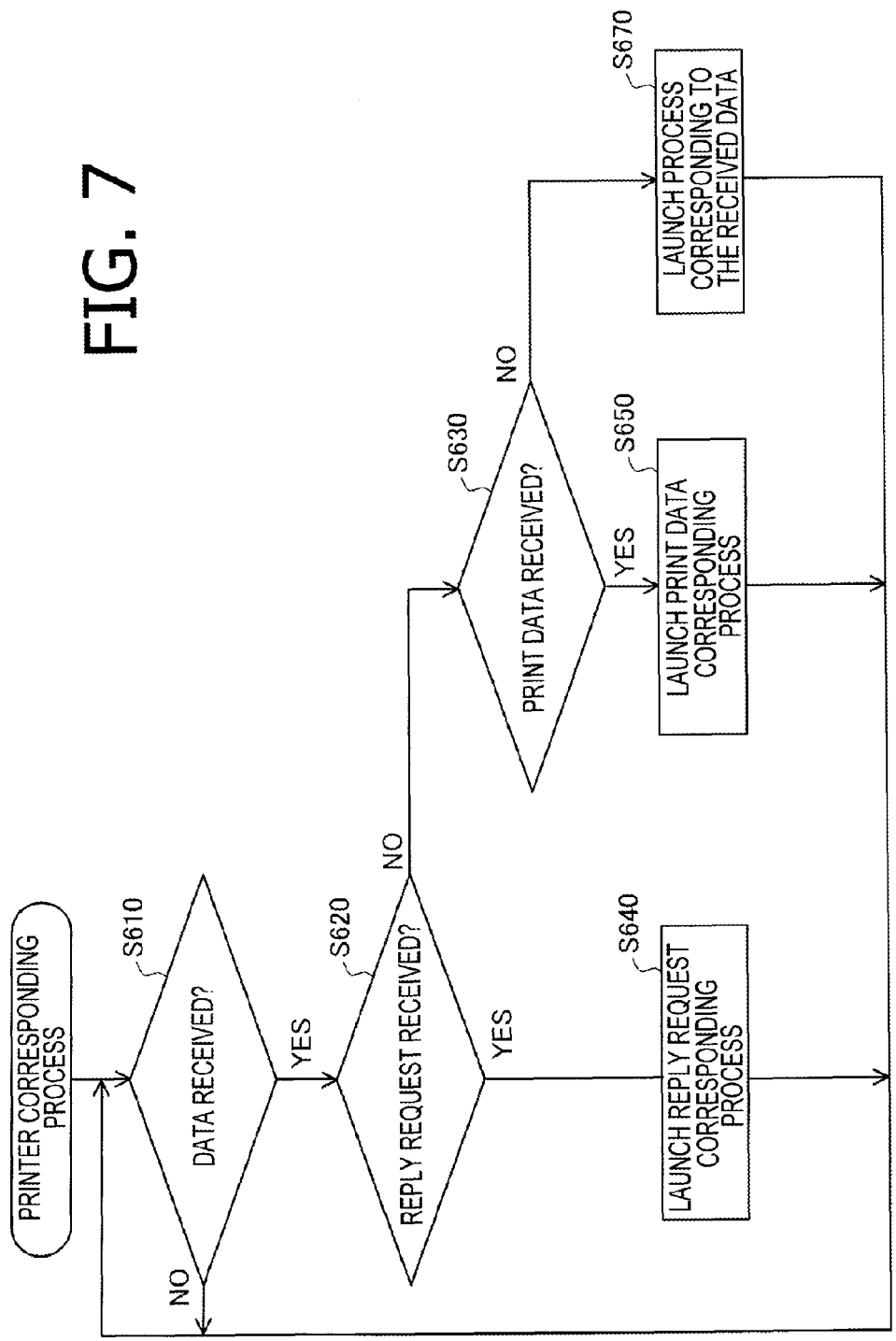

FIG. 7 is a flowchart showing a procedure of a printer corresponding process to be executed by a printer CPU of a printer included in the image forming system in the first illustrative embodiment according to one or more aspects of the present disclosure.

Figure 8:
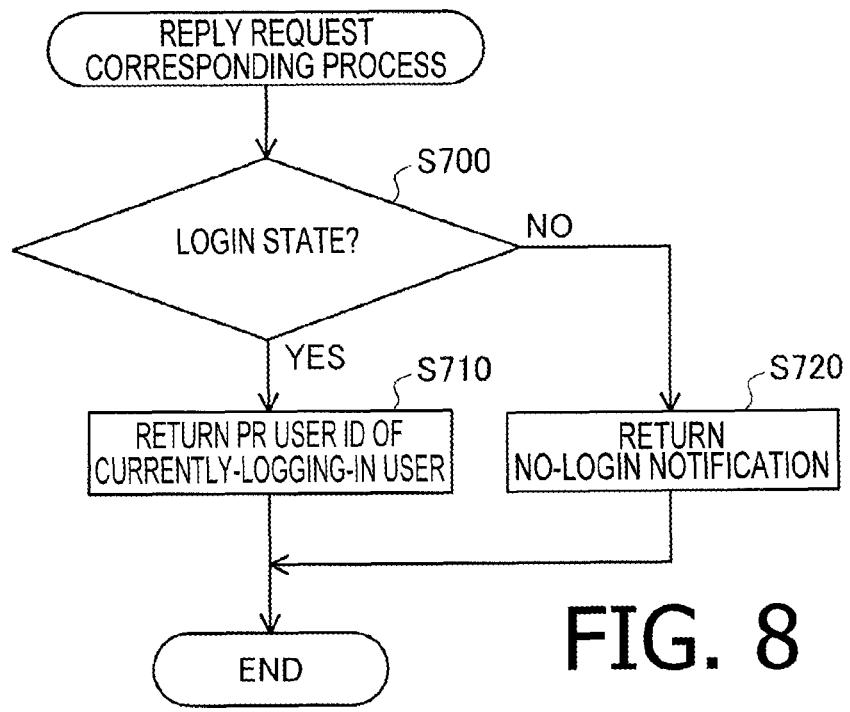

FIG. 8 is a flowchart showing a procedure of a reply request corresponding process to be executed by the printer CPU in the first illustrative embodiment according to one or more aspects of the present disclosure.

Figure 9:
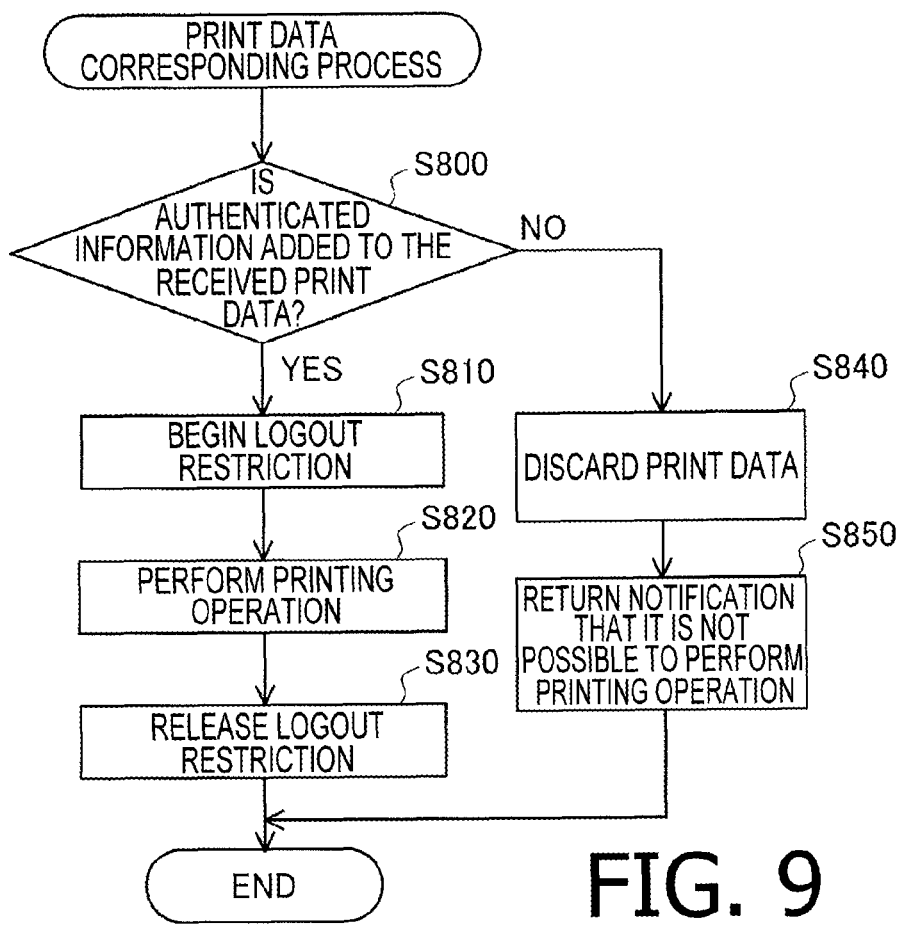

FIG. 9 is a flowchart showing a procedure of a print data corresponding process to be executed by the printer CPU in the first illustrative embodiment according to one or more aspects of the present disclosure.

Figure 10:
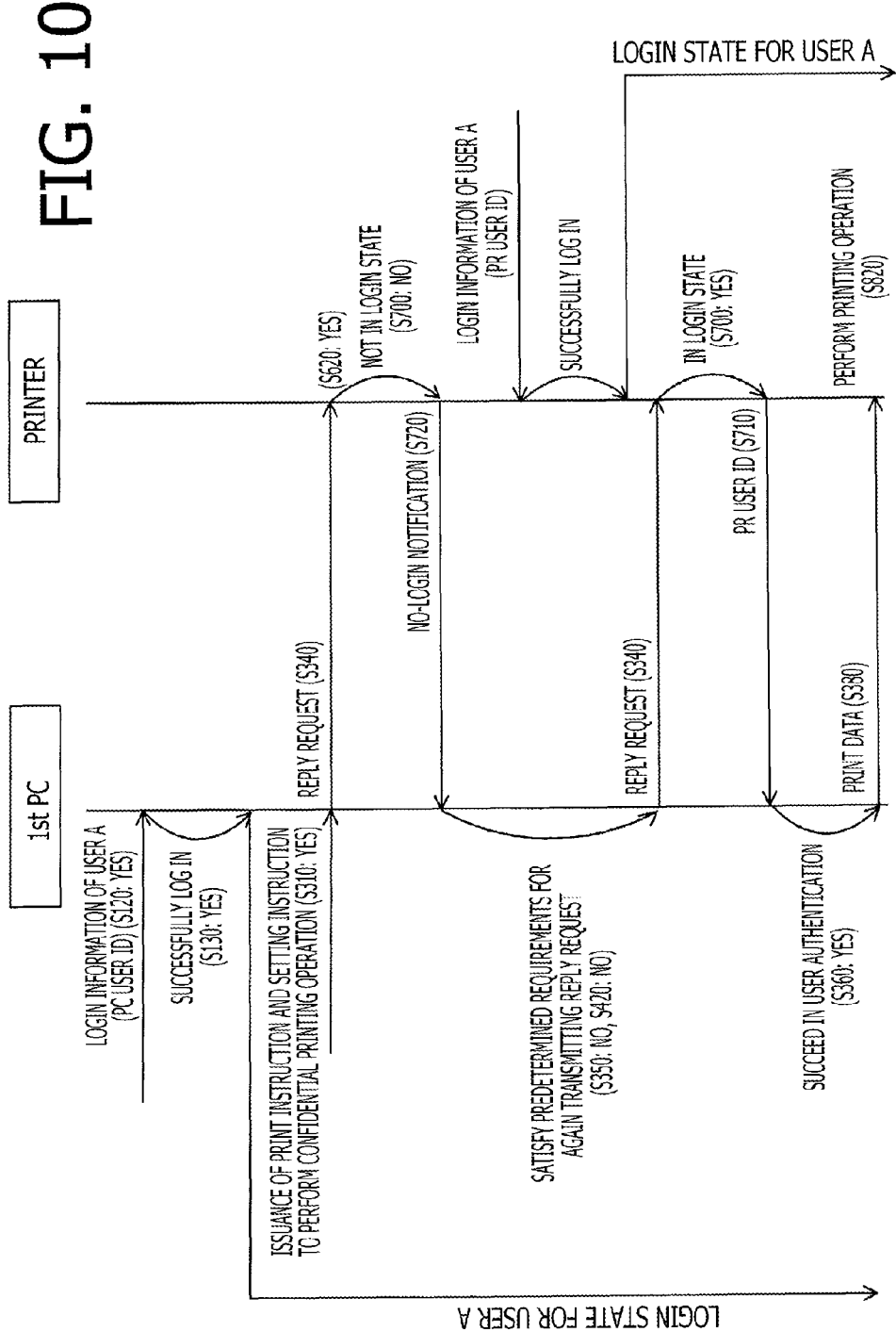

FIG. 10 is a sequence chart showing a sequence of data communication between the first PC and the printer in the first illustrative embodiment according to one or more aspects of the present disclosure.

Figure 11:
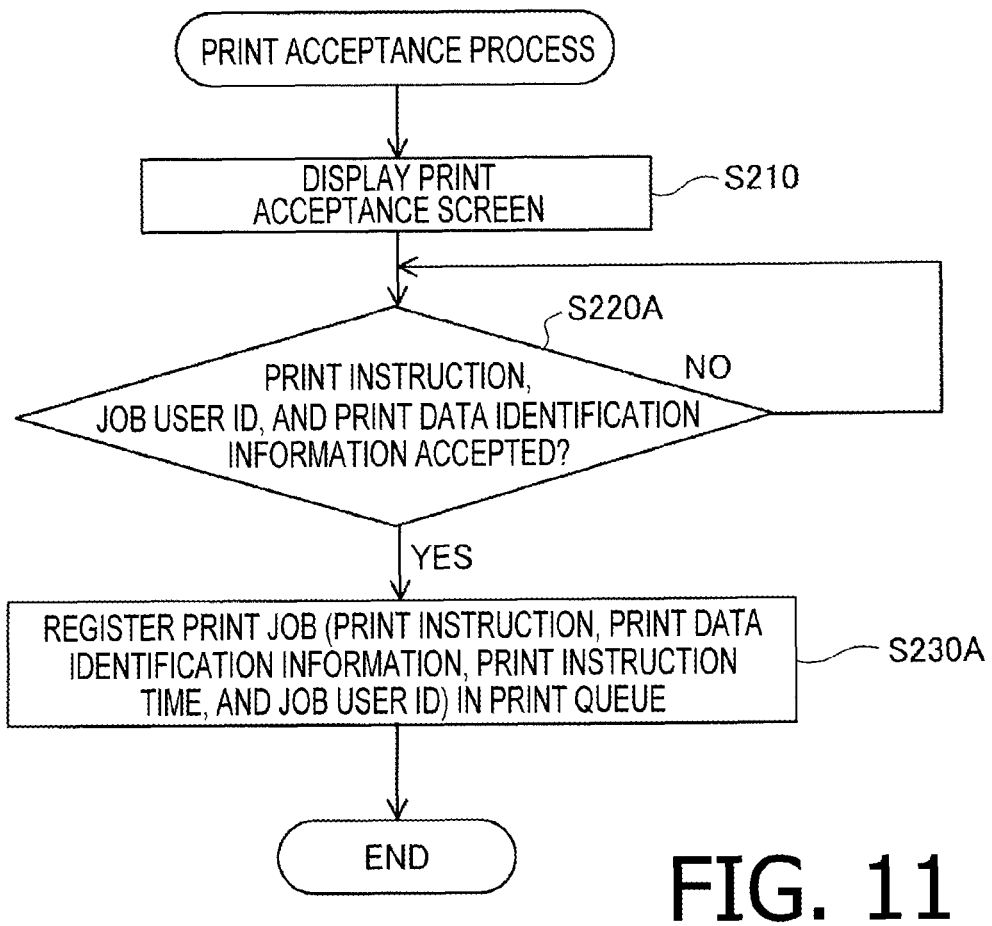

FIG. 11 is a flowchart showing a procedure of a print acceptance process to be executed by the first CPU in a second illustrative embodiment according to one or more aspects of the present disclosure.

Figure 12:
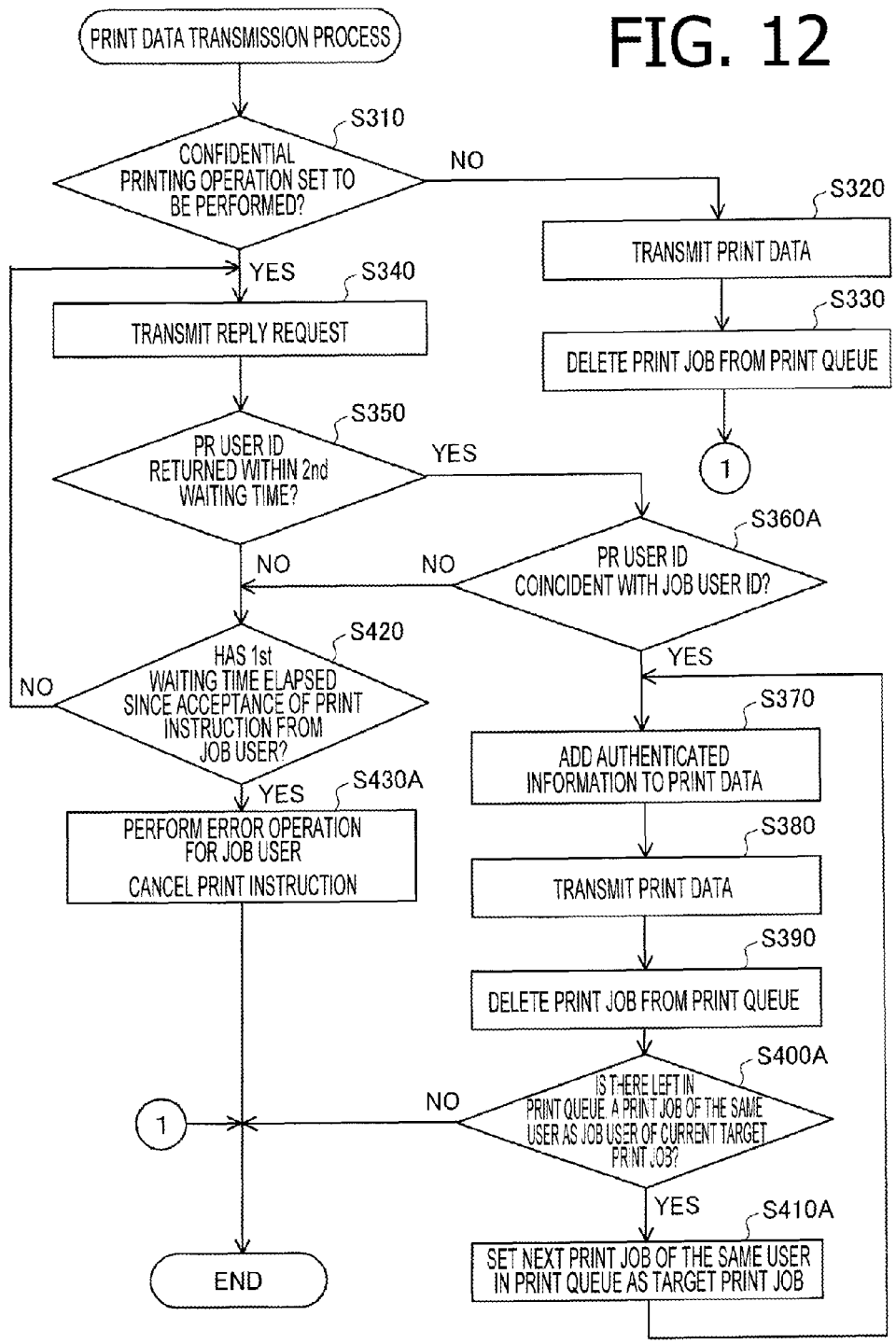

FIG. 12 is a flowchart showing a procedure of a print data transmission process to be executed by the first CPU in the second illustrative embodiment according to one or more aspects of the present disclosure.

Figure 13:
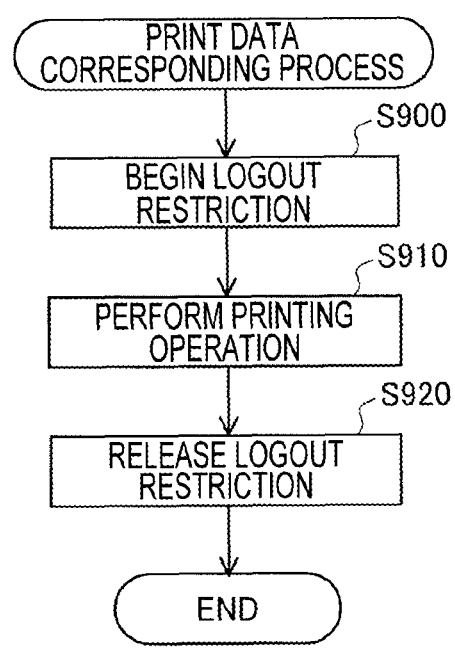

FIG. 13 is a flowchart showing a procedure of a print data corresponding process to be executed by the printer CPU in the second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

Figure 1:
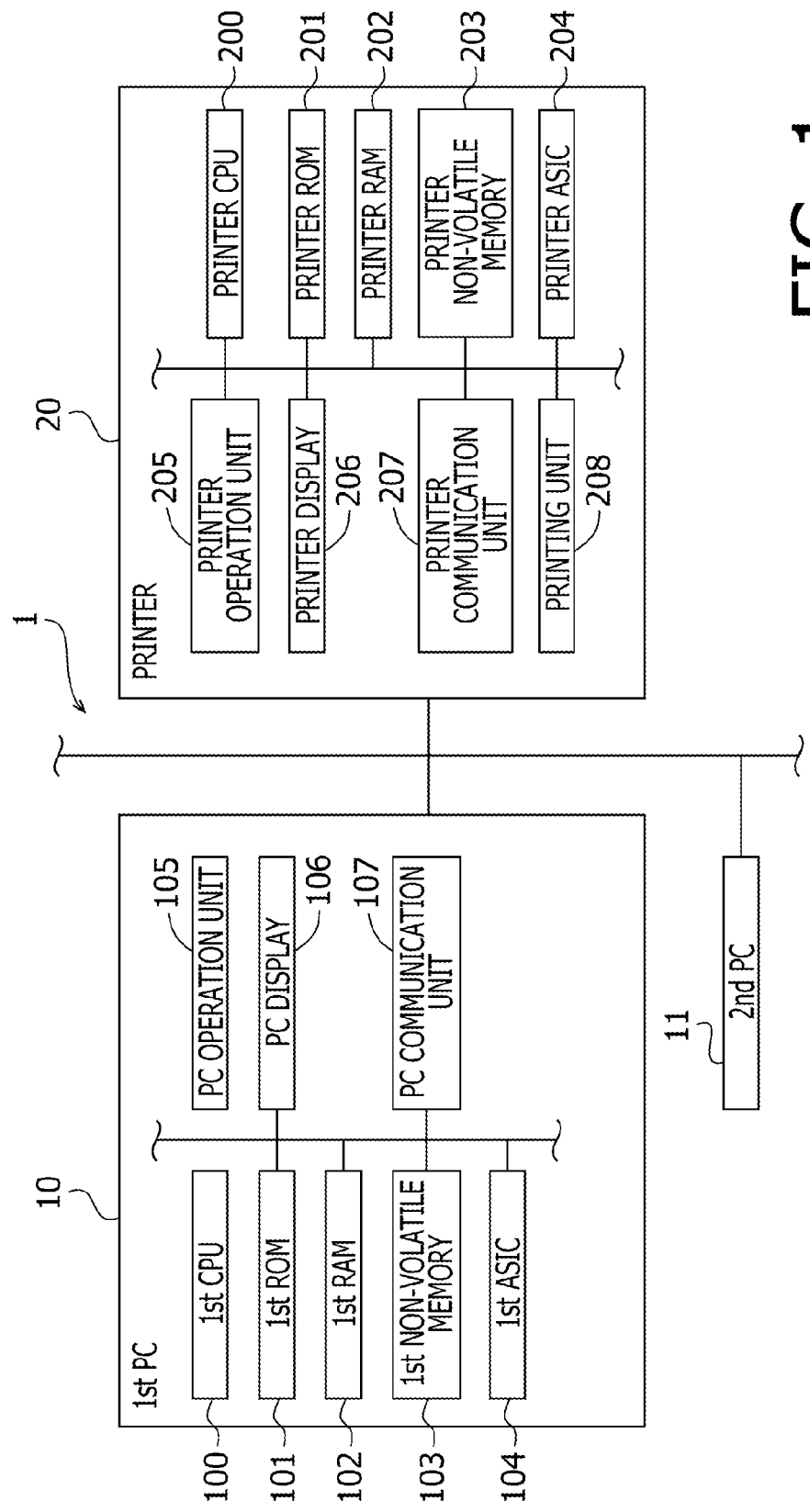
FIG. 1 is a block diagram showing an electrical configuration of an image forming system in a first illustrative embodiment according to one or more aspects of the present disclosure.

As shown in FIG. 1, an image forming system 1 of a first illustrative embodiment includes a first personal computer (hereinafter referred to as a "first PC") 10 and a printer 20. The first PC 10 and the printer 20 are communicably connected with each other via a network such as a LAN (which is an abbreviated form of "Local Area Network"). Further, FIG. 1 shows a second personal computer (hereinafter referred to as a "second PC") 11. The second PC 11 is also communicably connected with the printer 20 via the network.

The first PC 10 is an example of an information processing apparatus. The first PC 10 includes a first CPU 100, a first ROM 101, a first RAM 102, a first non-volatile memory 103, a first ASIC (which is an abbreviated form of "Application Specific Integrated Circuit") 104, a PC operation unit 105, a PC display 106, and a PC communication unit 107.

The first ROM 101 stores various programs. The various programs include programs for controlling an operation of each element included in the first PC 10 (e.g., a program for performing a below-mentioned print data transmission process). The first RAM 101 is used as a work area and/or a temporary data storage area when the first CPU 100 executes the various programs. The first non-volatile memory 103 is an example of a storage. The first non-volatile memory 103 may be a rewritable memory such as an NVRAM, a flash memory, an HDD, or an EEPROM.

The first CPU 100 is an example of a controller. The first CPU 100 is configured to control each element included in the first PC 10 in accordance with a program read out of the first ROM 101. For instance, the first ASIC 104 is a hardware circuit specifically for image processing. The PC operation unit 105 is an example of an operation unit. The PC operation unit 105 includes a plurality of buttons. The PC operation unit 105 is configured to accept user entries of various instructions. The PC display 106 includes a liquid crystal display. The PC display 106 is configured to display various setting screens and operational states of the first PC 10. It is noted that the PC operation unit 105 may include a touch panel configured to accept a user's input operation of touching a screen surface of the PC display 106. The PC communication unit 107 is an example of a communication unit. The PC communication unit 107 is configured to perform wireless communication or wired communication with external devices such as the printer 20. The second PC 11 is configured in the same manner as the first PC 10. Therefore, an explanation of a configuration of the second PC 11 will be omitted.

The printer 20 is an example of an image forming apparatus. The printer 20 includes a printer CPU 200, a printer ROM 201, a printer RAM 202, a printer non-volatile memory 203, a printer ASIC 204, a printer operation unit 205, a printer display 206, a printer communication unit 207, and a printing unit 208.

The printer ROM 201 stores various programs. The various programs include programs for controlling an operation of each element included in the printer 20 (e.g., a program for performing a below-mentioned printer corresponding process). The printer RAM 202 is used as a work area and/or a temporary data storage area when the printer CPU 200 executes the various programs. The printer non-volatile memory 203 may be a rewritable memory such as an NVRAM, a flash memory, an HDD, or an EEPROM.

The printer CPU 200 is an example of an image-forming-apparatus-side controller. The printer CPU 200 is configured to control each element included in the printer 20 in accordance with a program read out of the printer ROM 201. For instance, the printer ASIC 204 is a hardware circuit specifically for image processing. The printer operation unit 205 is an example of an image-forming-apparatus-side operation unit. The printer operation unit 205 includes a plurality of buttons. The printer operation unit 205 is configured to accept user entries of various instructions. The printer display 206 includes a liquid crystal display. The printer display 206 is configured to display various setting screens and operational states of the printer 20. It is noted that the printer operation unit 205 may include a touch panel configured to accept a user's input operation of touching a screen surface of the printer display 206. The printer communication unit 207 is an example of an image-forming-apparatus-side communication unit. The printer communication unit 207 is configured to perform wireless communication or wired communication with external devices such as the first PC 10 and the second PC 11. The printing unit 208 is an example of an image forming unit. The printing unit 208 is configured to form an image on a sheet in an image forming method such as an electrophotographic method or an inkjet method.

As will be described below, the first CPU 100 of the first PC 10 performs a login process shown in FIG. 2, a print acceptance process shown in FIG. 3, a print data transmission process shown in FIG. 4, and a browsing process shown in FIG. 5.

The login process by the first CPU 100 is a process to switch the operational state of the first PC 10 between a logout state to accept an entry of login information and a login state to accept entries of other commands. When the first PC 10 is powered on, the first CPU 100 performs the login process shown in FIG. 2. Specifically, the first CPU 100 controls the PC display 106 to display a login screen (not shown) (S110), and determines whether the first CPU 100 has accepted login information (S120). The first CPU 100 is allowed to accept login information via the PC operation unit 105. For instance, the login information includes user identification information and a password. Hereinafter, the user identification information accepted via the PC operation unit 105 will be referred to as "PC user ID."

When the first CPU 100 determines that the first CPU 100 has not accepted login information (S120: No), the first PC 10 is in the logout state to accept login information. When determining that the first CPU 100 has accepted login information when the first PC 10 is in the logout state (S120: Yes), the first CPU 100 performs login authentication, and determines whether the login authentication has been successfully performed (S130). Specifically, for instance, the first CPU 100 determines whether the login information accepted in S120 is coincident with registered login information that is previously stored in the first non-volatile memory 103. When determining that the login information accepted in S120 is coincident with the registered login information, the first CPU 100 determines that the login authentication has been successfully performed (S130: Yes), i.e., the first CPU 100 determines that a user corresponding to the PC user ID is permitted to log in to the first PC 10. Meanwhile, When determining that the login information accepted in S120 is not coincident with the registered login information, the first CPU 100 determines that the login authentication has not been successfully performed (S130: No), i.e., the first CPU 100 determines that the user corresponding to the PC user ID is not permitted to log in to the first PC 10. It is noted that the first CPU 100 may determine whether the login information accepted in S120 is coincident with registered login information received from a server apparatus (not shown) via the PC communication unit 107.

When determining that the login authentication has not been successfully performed, i.e., that the first CPU 100 has failed in the login authentication (S130: No), the first CPU 100 goes back to S120 and waits until the first CPU 100 accepts a new entry of login information. Namely, the first CPU 100 maintains the logout state of the first PC 10. Meanwhile, when determining that the login authentication has been successfully performed (S130: Yes), the first CPU 100 stores the PC user ID included in the login information used for the successful login authentication, e.g., into the first non-volatile memory 103 (S140). Then, the first CPU 100 switches the operational state of the first PC 10 from the logout state to the login state (S150). While the first PC 10 is in the login state, the first CPU 100 accepts various instructions such as a below-mentioned print instruction, and performs an operation corresponding to each accepted instruction. After that, when determining that a logout instruction has not been accepted (S160: No), the first CPU 100 maintains the login state of the first PC 10. When determining that a logout instruction has been accepted (S160: Yes), the first CPU 100 releases the login state, i.e., switches from the login state to the logout state (S170). Thereafter, the first CPU 100 goes back to S110, in which the first CPU 100 controls the PC display 106 to display the login screen (not shown) (S110), and waits until the first CPU 100 accepts a new entry of login information (S120).

The print acceptance process is a process to accept and manage a print instruction. In the aforementioned login process, when a print request is input via the PC operation unit 105 after the first PC 10 is placed into the login state, the first CPU 100 performs the print acceptance process shown in FIG. 3. Specifically, the first CPU 100 controls the PC display 106 to display a print acceptance screen (not shown) (S210), and determines whether a print instruction and print data identification information have been accepted (S220). The print data identification information identifies print data to be printed in accordance with the print instruction. The first CPU 100 is allowed to accept a print instruction via the PC operation unit 105. The print instruction is an example of an image forming instruction. The print data is an example of image data. The print data may be dot pattern data or data described in a page description language (hereinafter referred to as "PDL"). The print data identification information is an example of image data identification information.

When determining that none of a print instruction and print data identification information has been accepted (S220: No), the first CPU 100 waits until the first CPU 100 accepts a print instruction and print data identification information. Meanwhile, when determining that a print instruction and print data identification information have been accepted (S220: Yes), the first CPU 100 registers the print instruction, the print data identification information, and a clock time at which the print instruction has been issued, in association with each other, in a print queue stored, e.g., in the first non-volatile memory 103 (S230). Hereinafter, the clock time may be referred to as a "print instruction time." Thereafter, the first CPU 100 terminates the print acceptance process. Hereinafter, a combination of the print instruction, the print data identification information, and the print instruction time may be referred to as a "print job." It is noted that each time the user issues a print request, the first CPU 100 repeatedly performs the print acceptance process, and consequently, it is possible to register a plurality of print jobs in the print queue. Each print job is registered in association with a corresponding piece of login information (e.g., a corresponding PC user ID and a corresponding password).

The print data transmission process is a process to transmit, to the printer 200, print data corresponding to the print instruction. On condition that at least one print job is registered in the print queue in the aforementioned print acceptance process, the first CPU 100 performs the print data transmission process shown in FIG. 4. Specifically, the first CPU 100 first determines which one of a below-mentioned regular printing operation and a below-mentioned confidential printing operation is set to be performed (S310). The first CPU 100 is allowed to accept, via the PC operation unit 105, a setting instruction that specifies which one of the regular printing operation and the confidential printing operation is set to be performed.

The user who is permitted to log in to the first PC 10 is allowed to arbitrarily issue a setting instruction via the PC operation unit 105 when issuing the print instruction. Further, the first PC 10 (the image forming system 1) may be configured such that a particular user (e.g., an administrator of the image forming system 1) identified by a predetermined particular user ID is allowed to issue a setting instruction. Specifically, the first PC 100 may be configured to, when an attempt to log in to the first PC 10 is made using a user ID different from the particular user ID, not accept a setting instruction via the PC operation unit 105. Thereby, it is possible to prevent a user corresponding to a user ID different from the particular user ID from easily issuing a setting instruction. The particular user ID is an example of registered user information. When accepting a setting instruction, the first CPU 100 stores a setting specified by the accepted setting instruction into the first non-volatile memory 103. Referring to the setting stored in the first non-volatile memory 103, the first CPU 100 determines which one of the below-mentioned regular printing operation and the below-mentioned confidential printing operation is set to be performed (S310).

When determining that the regular printing operation is set to be performed (S310: No), the first CPU 100 transmits print data associated with a current target print job to be processed, to the printer 20 via the PC communication unit 107, without transmitting a reply request to the printer 20 (S320). Then, the first CPU 100 deletes the current target print job from the print queue (S330). Thereafter, the first CPU 100 terminates the print data transmission process. When another print job is registered in the print queue after execution of the operation in S330, the first CPU 100 may transmit print data associated with the registered print job to the printer 20 via the PC communication unit 107.

When determining that the confidential printing operation is set to be performed (S310: Yes), the first CPU 100 transmits a reply request to the printer 20 via the PC communication unit 107 (S340). Then, the first CPU 100 determines whether a PR user ID has been returned, as a reply to the reply request, from the printer 20 by a point of time when a second waiting time elapses since transmission of the reply request (S350). The second waiting time is an example of a particular period of time. It is noted that when a below-mentioned no-login notification is returned by the printer 20, the first CPU 100 determines whether a PR user ID has not been returned by the printer 20. When determining that a PR user ID has been returned by the printer 20 (S350: Yes), the first CPU 100 determines whether the returned PR user ID is coincident with the PC user ID stored into the first non-volatile memory 103 in S140 (S360).

When determining that the returned PR user ID is coincident with the PC user ID (S360: Yes), the first CPU 100 adds, to the print data associated with the current target print job, authenticated information that indicates that the PR user ID is coincident with the PC user ID (S370). As examples of the authenticated information, data indicating successful authentication, and a PR user ID or a PC user ID used for successful authentication may be cited. The first CPU 100 transmits the print data with the authenticated information added thereto, to the printer 20 via the PC communication unit 107 (S380). Then, the first CPU 100 deletes the current target print job from the print queue (S390).

Thereafter, the first CPU 100 determines whether there is left a print job registered in the print queue (S400). When determining that there is left a print job registered in the print queue (S400: Yes), the first CPU 100 sets a next print job left in the print queue as a target print job to be processed (S410). Thereafter, the first CPU 100 goes back to S370. Thereby, it is possible to transmit, to the printer 20, print data associated with the print job left in the print queue with the authenticated information added to the print data, without having to transmit a reply request in S340 or perform user authentication in S360. When determining that there is not left a print job registered in the print queue (S400: No), the first CPU 100 terminates the print data transmission process.

When determining in S360 that the returned PR user ID is not coincident with the PC user ID (S360: No), the first CPU 100 determines whether a first waiting time has elapsed since acceptance of the print instruction corresponding to the current target print job, with reference to the print instruction time (S420). The first waiting time referred to here is an example of a reference period of time. When determining that the first waiting time has not elapsed since acceptance of the print instruction (S420: No), the first CPU 100 repeatedly performs a repeat process. The repeat process includes an operation of again transmitting a reply request to the printer 20 (S340), and an operation of, when determining that a PR user ID has been returned by the printer 20 (S350: Yes), determining whether the returned PR user ID is coincident with the PC user ID stored into the first non-volatile memory 103 in S140 (S360). Thereby, it is possible to make it more likely that the PC user ID and the PR user ID are determined to be coincident with each other, than when the reply request is transmitted just once. It is noted that determining that the PR user ID is not coincident with the PC user ID (S360: No) and determining that the first waiting time has not elapsed since acceptance of the print instruction (e.g., since a beginning of the repeat process) (S420: No) are examples of a repeat condition.

Meanwhile, even though determining in S360 that the PR user ID is not coincident with the PC user ID (S360: No), when determining that the first waiting time has elapsed since acceptance of the print instruction (S420: Yes), the first CPU 100 stops the repeat process. Thereby, even though it is still in a situation where the PR user ID is not coincident with the PC user ID, it is possible to prevent transmission of the reply request from being unnecessarily repeated. Thereafter, the first CPU 100 performs an error operation and cancels the print instruction (S430). Then, the first CPU 100 terminates the print data transmission process. For instance, the error operation is an operation of controlling the PC display 106 to display error information that it is not possible to transmit the print data due to a failure in user authentication or a communication error. The first CPU 100 cancels the print instruction, e.g., by deleting the current target print job from the print queue. Thereby, it is possible to cancel transmission of the print data of which printing has become unnecessary before the print data is transmitted to the printer 20, after issuance of the print instruction.

When determining in S350 that a PR user ID has not been returned by the printer 20 (S350: No), the first CPU 100 determines whether the first waiting time has elapsed since acceptance of the print instruction, with reference to the print instruction time (S420). At this time, the first waiting time is longer than the second waiting time. The first waiting time referred to here is an example of a predetermined period of time. It is noted that the first waiting time set when the first CPU 100 determines in S350 that a PR user ID has not been returned by the printer 20 (S350: No) may be different from the first waiting time set when the first CPU 100 determines in S360 that the PR user ID is not coincident with the PC user ID (S360: No). For instance, the first waiting time set when the first CPU 100 determines in S350 that a PR user ID has not been returned by the printer 20 (S350: No) may be shorter than the first waiting time set when the first CPU 100 determines in S360 that the PR user ID is not coincident with the PC user ID (S360: No). When determining that the first waiting time has not elapsed since acceptance of the print instruction (S420: No), the first CPU 100 again transmits a replay request to the printer 20, without making an authentication determination between the PR user ID and the PC user ID (i.e., without determining whether the PR user ID is coincident with the PC user ID) (S340). Thereby, it is possible to make it more likely that the PR user ID is returned to the first PC 10 even though a temporary communication error occurs, than when the reply request is transmitted just once to the printer 20.

Meanwhile, even though determining that a PR user ID has not been returned by the printer 20 (S350: No), when determining that the first waiting time has elapsed since acceptance of the print instruction (S420: Yes), the first CPU 100 performs the error operation and cancels the print instruction (S430). Then, the first CPU 100 terminates the print data transmission process. Thereby, even though it is still in a situation where the PR user ID has not been returned by the printer 20, it is possible to prevent transmission of the reply request from being unnecessarily repeated.

The browsing process is a process to display a list of print jobs registered in the print queue. On condition that the first CPU 100 has accepted a browsing instruction from the user via the PC operation unit 105, the first CPU 100 performs the browsing process shown in FIG. 5, in parallel with the print acceptance process and the print data transmission process. Specifically, the first CPU 100 controls the PC display 106 to display a browsing screen as shown in FIG. 6 (S510). On the browsing screen, print jobs that are currently registered in the print queue and held without being transmitted are listed. Each of the listed print jobs is displayed in association with a user name and a print instruction time. Thereby, the user is allowed to confirm the print jobs that are registered in the print queue and held without being transmitted.

Further, there are a cancel button and an end button provided on the browsing screen. When the user selects, via the PC operation unit 105, a particular one of the print jobs listed on the browsing screen and presses the cancel button, the first CPU 100 determines that the first CPU 100 has accepted a cancel instruction (S520: Yes), and deletes the selected print job from the print queue (S530). Thereafter, when the user does not press the end button via the PC operation unit 105, the first CPU 100 determines that the first CPU 100 has not accepted an end instruction (S540: No), and comes into a standby state (S520). Meanwhile, when the user presses the end button via the PC operation unit 105, the first CPU 100 determines that the first CPU 100 has accepted an end instruction (S540: Yes), and terminates the browsing process. When the user presses the end button without pressing the cancel button, the first CPU 100 determines that the first CPU 100 has accepted an end instruction without accepting a cancel instruction (S520: No, and S540: Yes), and terminates the browsing process without deleting any print job.

As will be described below, the printer CPU 200 of the printer 20 is configured to perform a login process and a printer corresponding process shown in FIG. 7.

The login process by the printer CPU 200 is a process to switch the operational state of the printer 20 between a logout state to accept an entry of login information and a login state to accept entries of other commands. The login process by the printer CPU 200 is substantially the same as the aforementioned login process (see FIG. 2) by the first CPU 100. Therefore, a detailed explanation of the login process by the printer CPU 200 will be omitted. In this regard, nonetheless, in the login process by the printer CPU 200, a login screen is displayed on the printer display 206. In addition, the login information is accepted via the printer operation unit 205. Further, user identification information contained in the login information is an example of second user information, and hereinafter will be referred to as "PR user ID." The PR user ID is stored into the printer non-volatile memory 203.

When the printer 20 is powered on, the printer CPU 200 performs the printer corresponding process shown in FIG. 7. The printer corresponding process is a process to launch various processes corresponding to data received from external devices. Specifically, the printer CPU 200 determines whether the printer CPU 200 has received data from an external device via the printer communication unit 207 (S610). When determining that the printer CPU 200 has not received data from an external device via the printer communication unit 207 (S610: No), the printer CPU 200 waits for data coming from an external device. When determining that the printer CPU 200 has received data from an external device via the printer communication unit 207 (S610: Yes), the printer CPU 200 determines whether the received data is a reply request as described above (S620). When determining that the received data is a reply request (S620: Yes), the printer CPU 200 launches a reply request corresponding process (S640). Thereafter, the printer CPU 200 goes back to S610 and waits for new data coming from an external device.

When determining that the received data is not a reply request but print data (S620: No, and S630: Yes), the printer CPU 200 launches a print data corresponding process (S650). Thereafter, the printer CPU 200 goes back to S610, and waits for new data coming from an external device. When determining that the received data is not a reply request or print data (S620: No, and S630: No), the printer CPU 200 launches a process corresponding to the received data (S670). Thereafter, the printer CPU 200 goes back to S610, and waits for new data coming from an external device. With respect to the process to be executed when the printer CPU 200 determines the received data is not a reply request or print data, an explanation of the process will be omitted.

In the reply request corresponding process (see FIG. 8), the printer CPU 200 determines whether the printer 20 is currently in the login state (S700). When determining that the printer 20 is currently in the login state (S700: Yes), the printer CPU 200 reads a PR user ID corresponding to a user who is logging in to the printer 20 from the printer non-volatile memory 203, and returns the read PR user ID to the first PC 10 via the printer communication unit 207 (S710). Thereafter, the printer CPU 200 terminates the reply request corresponding process. Meanwhile, when determining that the printer 20 is not in the login state (S700: No), the printer CPU 200 returns a no-login notification to the first PC 10 via the printer communication unit 207 (S720). Thereafter, the printer CPU 200 terminates the reply request corresponding process.

In the print data corresponding process, the printer CPU 200 determines whether the received print data includes authenticated information added thereto (S800). When determining that the received print data includes authenticated information added thereto (S800: Yes), the printer CPU 200 begins a logout restriction to restrict (prohibit) acceptance of a logout instruction via the printer operation unit 205 and maintains the login state where the current user is logging in to the printer 20 (S810). Then, the printer CPU 200 controls the printing unit 208 to perform a printing operation based on the print data (S820). After completion of the printing operation, the printer CPU 200 releases the logout restriction to make it possible to release the login state for the current user (S830). Thereafter, the printer CPU 200 terminates the print data corresponding process. Thereby, it is possible to prevent the user who has input the PR user ID from logging out from the printer 20 (i.e., releasing the login state of the printer 20) or being away from the installation location of the printer 20 before the printer 20 receives the print data or before the printing operation based on the print data is completed.

When determining that the received print data does not include authenticated information added thereto (S800: No), the printer CPU 200 discards the print data without controlling the printing unit 208 to perform a printing operation (S840). Then, the printer CPU 200 transmits a notification that it is not possible to perform a printing operation based on the print data, to the first PC 10 via the printer communication unit 207 (S850). Thereafter, the printer CPU 200 terminates the print data corresponding process. Thereby, it is possible to, when the received print data does not correspond to the reply request (more specifically, when the received print data does not correspond to the PR user ID returned in response to the reply request), prevent the printer 20 from performing a printing operation based on the print data. Further, in a case where the authenticated information is a PC user ID used for successful authentication, when the PR user ID returned in response to the reply request is different from the PC user ID associated with the received print data, the printer 20 is not allowed to perform a printing operation based on the print data. Thus, it is possible to achieve a higher level of security for the print data.

As shown in FIG. 10, the first PC 10 accepts login information of a user A (S120: Yes). When the login authentication using the accepted login information has been successfully performed (S130: Yes), the first PC 10 is brought into the login state where the user A is logging in to the first PC 10. In that state, when a print instruction is issued by the user A, and the first PC 10 accepts a setting instruction specifying that the confidential printing operation is set to be performed (S310: Yes), at this point of time, the first PC 10 does not transmit print data to the printer 20 but transmits a reply request to the printer 20 (S340).

Meanwhile, when the printer 20 is not in the login state at a point of time when having received a first reply request (S700: No), the printer 20 returns the no-login notification to the first PC 10 (S720). When receiving the no-login notification and determining that predetermined requirements are not satisfied (e.g., S350: No, and S420: No), the first PC 10 again transmits a reply request to the printer 20 (S340).

Here, suppose for instance that the printer 20 receives the login information of the user A, and the login authentication using the received login information is successfully performed before a reply request is transmitted again by the first PC 10. In this case, the printer 20 is brought into the login state where the user A is logging in to the printer 20 (S700: Yes). Thus, the PR user ID of the user A is returned to the first PC 10 (S710). The first PC 10 determines that the returned PR user ID is coincident with the PC user ID and that the user authentication has been successfully performed (S360: Yes). The first PC 10 transmits print data to the printer 20.

As described above, according to the first illustrative embodiment, unless the printer 20 accepts the PR user ID coincident with the PC user ID, the printer 20 is not allowed to perform a printing operation based on the print data. Therefore, it is possible to avoid a situation where an image printed on a sheet by the printer 20 is seen by a third party. Thus, it is possible to achieve a higher level of security. Further, it is possible to achieve a shorter period of time during which the print data occupies a particular space of the memory of the printer 20, than when the print data is transmitted from the first PC 10 to the printer 20 only in response to acceptance of the print instruction. Moreover, there is no need to secure a wide memory area for storing the print data at the side of the printer 20. Furthermore, there is no need to perform user authentication at the side of the printer 20. Therefore, it is possible to avoid inconvenience such as an increase in a processing load of the printer 20.

Further, on condition that the PC user ID used for the successful login to the first PC 10 is coincident with the PR user ID used for the successful login to the printer 20, the print data is transmitted to the printer 20, and the printing operation based on the print data is performed. Thus, it is possible to achieve a higher level of security for the print data.

Subsequently, a second illustrative embodiment will be described with reference to FIGS. 11 to 13. The second illustrative embodiment is different from the first illustrative embodiment in operations to be executed by the first CPU 100 in the print acceptance process and the print data transmission process. The other features in the second illustrative embodiment are substantially the same as those in the first illustrative embodiment. Hereinafter, accordingly, the differences from the first illustrative embodiment will be described, but the same elements and steps as exemplified in the first illustrative embodiment will be provided with the same reference characters, and redundant explanations of them will be omitted.

Figure 2:
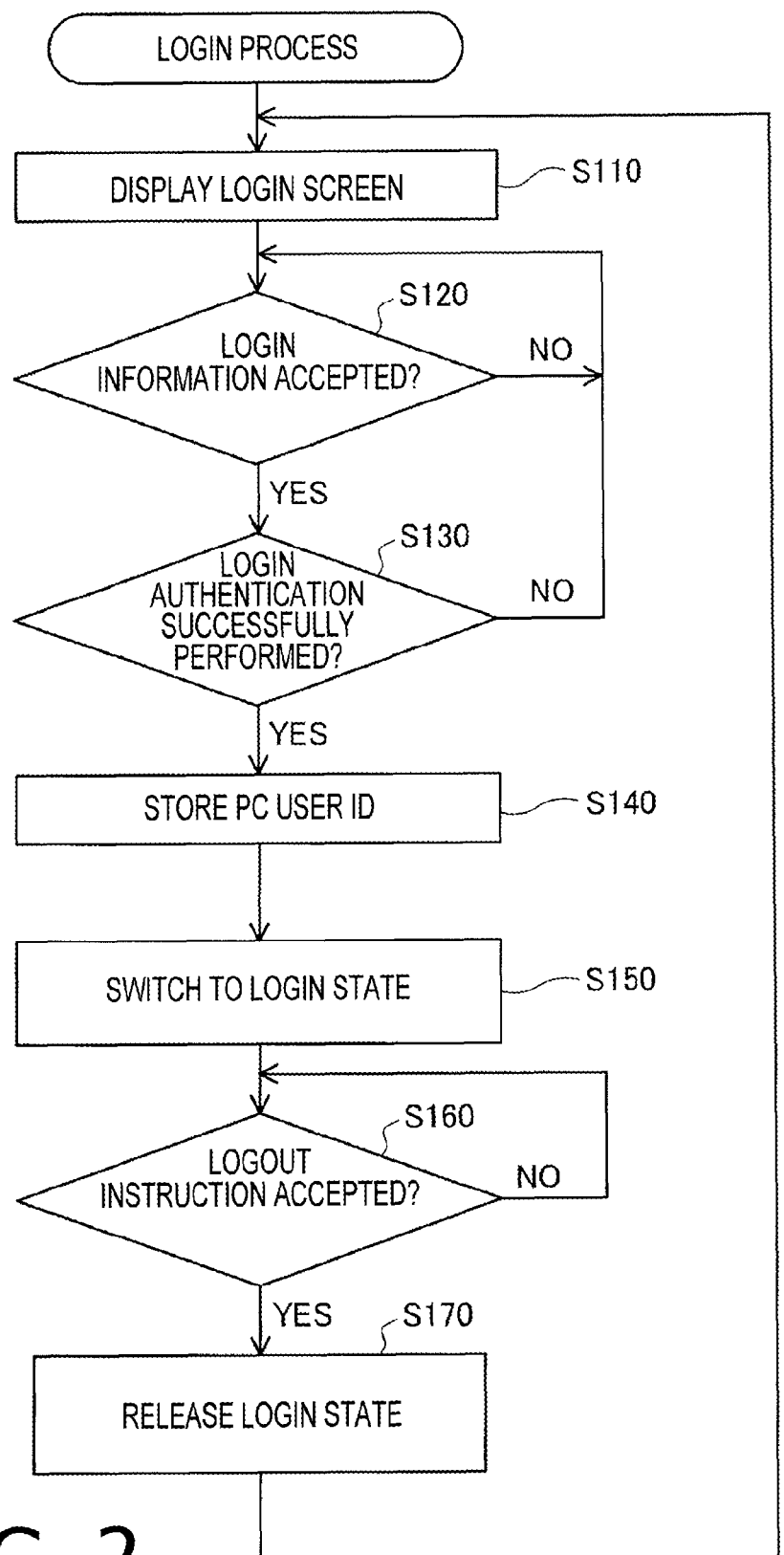
FIG. 2 is a flowchart showing a procedure of a login process in the first illustrative embodiment according to one or more aspects of the present disclosure.
Figure 3:
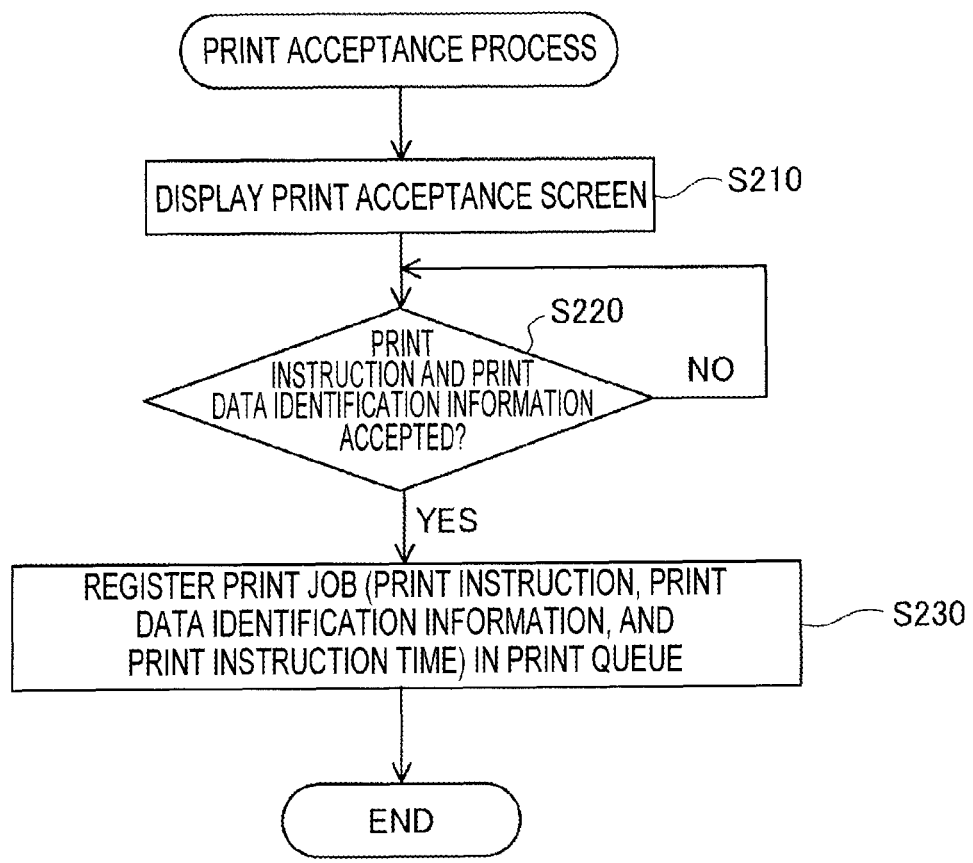
FIG. 3 is a flowchart showing a procedure of a print acceptance process to be executed by a first CPU of a first personal computer (hereinafter referred to as a "first PC") included in the image forming system in the first illustrative embodiment according to one or more aspects of the present disclosure.

In the second illustrative embodiment, the first CPU 100 is allowed to accept print instructions from a plurality of users without having to perform the login process shown in FIG. 2. The first CPU 100 performs the print acceptance process and the print data transmission process in accordance with an individual print instruction from each user.

Specifically, in S220A of a print acceptance process shown in FIG. 11, the first CPU 100 determines whether user identification information, as well as a print instruction and print data identification information, has been accepted. Hereinafter, the user identification information may be referred to as a "job user ID." When determining that a print instruction, print data identification information, and a job user ID have been accepted (S220A: Yes), the first CPU 100 registers the print instruction, the print data identification information, a print instruction time, and the job user ID in the print queue in association with each other (S230A). Thereafter, the first CPU 10 terminates the print acceptance process. Hereinafter, a combination of the print instruction, the print data identification information, the print instruction time, and the job user ID may be referred to as a "print job." A user corresponding to the job user ID may be referred to as a "job user." It is noted that each time the user issues a print request, the first CPU 100 repeatedly performs the print acceptance process, and consequently, it is possible to register respective print jobs of a plurality of users in the print queue.

In S360A of a print data transmission process shown in FIG. 12, the first CPU 100 determines whether the job user ID of the current target print job to be processed is coincident with the PR user ID. Further, in an error operation in S430A, the first CPU 100 controls the PC display 106 to display error information that it is not possible to transmit the print data due to a failure in user authentication or a communication error, in association with the job user of the current target print job. In S400A, the first CPU 100 determines whether there is left in the print queue, a print job of the same user as the job user of the current target print job. When determining that there is left in the print queue, a print job of the same user as the job user of the current target print job (S400A: Yes), the first CPU 100 sets a next print job of the same user in the print queue as a target print job to be processed (S410A). Thereafter, the first CPU 100 goes back to S370.

According to the second illustrative embodiment, with respect to each individual one of users associated respectively with a plurality of print instructions, it is possible to determine whether the job user ID of each individual user is coincident with the PR user ID. Further, based on a result of the determination, it is possible to determine whether to transmit the print data to the printer 20. Further, suppose for instance that, after the first PC 10 accepts a print instruction from the user A and transmits a reply request to the printer 2, before the PR user ID is returned to the first PC 10, the first PC 10 accepts another print instruction from the user B. Even in this case, when the returned PR user ID is coincident with the job user ID of the user A, the first PC 10 is allowed to transmit to the printer 20 the print data corresponding to the print instruction issued by the user A, and cause the printer 20 to perform a printing operation based on the print data.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

MODIFICATION

In the aforementioned illustrative embodiments, a personal computer has been described as an example of the information processing apparatus. Nonetheless, various mobile terminal devices such as a mobile phone and a tablet computer, and a server may be cited as examples of the information processing apparatus. Aspects of the present disclosure may be applied to the various mobile terminal devices and the server.

In the aforementioned first illustrative embodiment, the processes shown in FIGS. 2 to 5 are performed by a single processor (i.e., the first CPU 100). Nonetheless, the processes may be performed by a plurality of CPUs, or only by a specific hardware circuit such as the first ASIC 104. Alternatively, the processes may be performed by one or more CPUs and one or more hardware circuits in cooperation with each other. In these cases, one or more CPUs and one or more hardware circuits are examples of the controller.

In the aforementioned illustrative embodiments, the printer 20 has been described as an example of the image forming apparatus. Nonetheless, various apparatuses configured to perform an image forming operation, such as a copy machine, a multi-function peripheral, and a facsimile machine, may be cited as examples of the image forming apparatus. Aspects of the present disclosure may be applied to the various apparatuses such as the copy machine, the multi-function peripheral, and the facsimile machine.

In the aforementioned illustrative embodiments, the printing unit 208 configured to form an image on a sheet has been described as an example of the image forming unit. Nonetheless, for instance, a unit that includes a display and is configured to display an image on the display may be cited as an example of the image forming unit.

In the aforementioned first illustrative embodiment, the processes shown in FIGS. 2 and 7 are performed by a single processor (i.e., the printer CPU 200). Nonetheless, the processes may be performed by a plurality of CPUs, or only by a specific hardware circuit such as the printer ASIC 204. Alternatively, the processes may be performed by one or more CPUs and one or more hardware circuits in cooperation with each other. In these cases, one or more CPUs and one or more hardware circuits are examples of the image-forming-apparatus-side controller.

Figure 4:
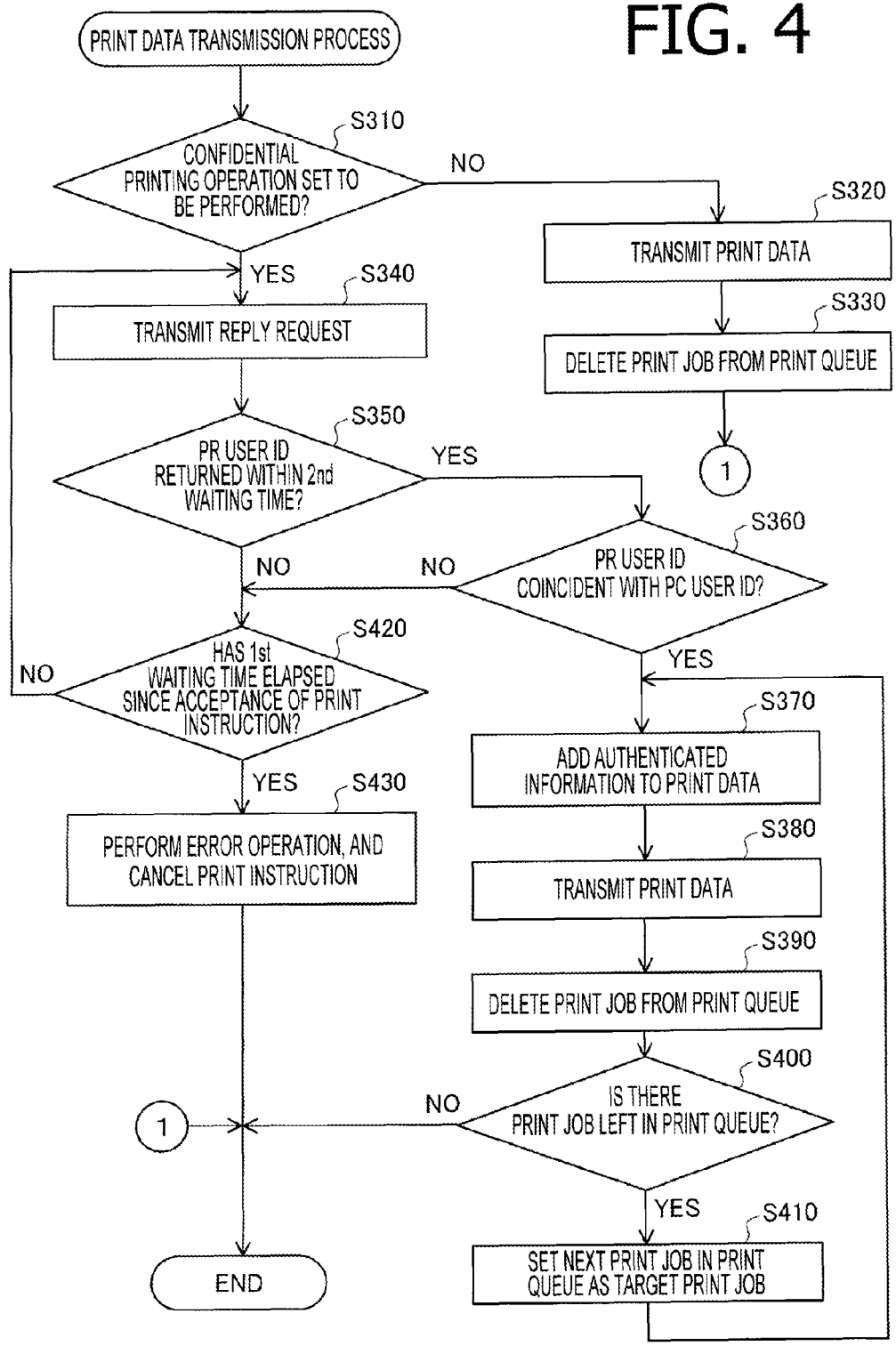
FIG. 4 is a flowchart showing a procedure of a print data transmission process to be executed by the first CPU in the first illustrative embodiment according to one or more aspects of the present disclosure.

In the user authentication in S360 shown in FIG. 4, the first CPU 100 determines whether the PC user ID is coincident with the PR user ID. Nonetheless, for instance, the first CPU 100 may determine whether the PC user ID and the PR user ID belong to a common group. The two IDs (i.e., the two pieces of user information) belonging to the common group is an example of the two pieces of user information having a particular relationship with each other. Further, in S360, the first CPU 100 may cause an external device to perform the user authentication. For instance, the first CPU 100 may transmit the PC user ID and the PR user ID to a server via the PC communication unit 107. Further, the first CPU 100 may receive a result of the user authentication performed by the server, via the PC communication unit 107.

The repeat condition in the print data transmission process shown in FIG. 4 may be only determining that the PR user ID is not coincident with the PC user ID. Namely, when determining that the PR user ID is not coincident with the PC user ID (S360: No), the first CPU 100 may go back to S340 without performing the operation in S420. Further, when determining that the PR user ID has not been returned by the printer 20 within the second waiting time since transmission of the reply request (S350: No), the first CPU 100 may go back to S340 without performing the operation in S420.

During a period of time from when the printer CPU 200 receives a reply request from the first PC 10 to when the printer CPU 200 receives print data corresponding to the reply request, the printer CPU 200 may restrict a user from logging in to the printer 20 with a user ID different from the PR user ID returned to the first PC 10. Thereby, during the period of time from when the printer CPU 200 receives a reply request from the first PC 10 to when the printer CPU 200 receives print data corresponding to the reply request, it is possible to prevent a third party other than the user corresponding to the PR user ID returned to the first PC 10 from operating the printer 20.

In the print data transmission process shown in FIG. 4, when determining that the PR user ID has not been returned by the printer 20 within the second waiting time since transmission of the reply request (S350: No) or when determining that the returned PR user ID is not coincident with the PC user ID stored into the first non-volatile memory 103 (S360: No), the first CPU 100 may go to S430 without transmitting a reply request. It is noted that there may be a case where it takes a period of time for a user who has issued a print instruction and input a PC user ID at the side of the first PC 10 to move to the installation location of the printer 20 and input a PR user ID. Therefore, in order to ensure the period of time, in the printer corresponding process shown in FIG. 7, when determining that the received data is a reply request (S620: Yes), the printer CPU 200 may make the determination in S630 after waiting for a predetermined period of time. Further, the first CPU 100 may transmit the print data in S380 without performing the operation in S370.

Instead of the print data corresponding process shown in FIG. 9, the printer CPU 200 may perform the print data corresponding process shown in FIG. 13. Specifically, when receiving the print data (FIG. 7, S630: Yes), the printer CPU 200 may launch the logout restriction to restrict (prohibit) acceptance of a logout instruction via the printer operation unit 205 (S900) without performing the operation in S800 shown in FIG. 9. Thereby, the printer CPU 200 may maintain the login state where the current user is logging in to the printer 20 and control the printing unit 208 to perform a printing operation based on the print data (S910). After completion of the printing operation, the printer CPU 200 may release the logout restriction (S920) to make it possible to release the login state for the current user. Thereafter, the printer CPU 200 may terminate the print data corresponding process. Further, in the print data corresponding process shown in FIG. 9, when determining that authenticated information is added to the print data (S800: Yes), the printer CPU 200 may go to S820 without performing the operation in S810. In this case, the printer CPU 200 may terminate the print data corresponding process without performing the operation in S830.

What is claimed is:

1. An information processing apparatus comprising:
    an operation unit;
    a storage;
    a communication unit configured to communicate with an image forming apparatus; and
    a controller configured to:
        accept, via the operation unit, image data identification information, an image forming instruction, and first user information, the image data identification information identifying image data to be image-formed, the image forming instruction being an instruction to cause the image forming apparatus to perform an image forming operation based on the image data;
        store, into the storage, the image data identification information, the image forming instruction, and the first user information;
        in response to acceptance of the image data identification information, the image forming instruction, and the first user information, transmit a reply request to the image forming apparatus via the communication unit, the reply request requesting the image forming apparatus to return second user information to the information processing apparatus, the second user information being returned to the information processing apparatus after a user identified by the second user information successfully logs in to the image forming apparatus;
        after transmission of the reply request, in response to receipt of the second user information returned by the image forming apparatus, determine whether the first user information stored in the storage is in a particular relationship with the second user information returned by the image forming apparatus;
        after receipt of the second user information returned by the image forming apparatus, when determining that the first user information is in the particular relationship with the second user information, transmit the image data identified by the image data identification information to the image forming apparatus via the communication unit; and
        when determining that the first user information is not in the particular relationship with the second user information, not transmit the image data identified by the image data identification information to the image forming apparatus via the communication unit;
    wherein the controller is further configured to:
        be on standby in a logoff state where the controller is allowed to accept login information via the operation unit, the login information including the first user information;
        while being on standby in the logoff state, accept the login information including the first user information via the operation unit;
        perform a login process comprising:
            when the accepted login information satisfies a particular condition, switching from the logoff state to a login state where the controller is allowed to accept the image forming instruction via the operation unit; and
            when the accepted login information does not satisfy the particular condition, maintaining the logoff state; and
            when accepting the image forming instruction after switching to the login state, use the first user information included in the login information, as user information identifying a user who is logging in to the information processing apparatus.

2. The information processing apparatus according to claim 1,
    wherein the controller is further configured to:
        accept, via the operation unit, the image forming instruction individually from each of a plurality of users; and
        each time accepting the image forming instruction from each individual user, accept the image data identification information and the first user information of each individual user, and register the image forming instruction, the image data identification information, and the first user information in association with each other, in an image formation queue stored in the storage.

3. The information processing apparatus according to claim 1,
    wherein the controller is further configured to repeatedly perform a repeat process while a repeat condition is satisfied, the repeat condition comprising determining that the first user information is not in the particular relationship with the second user information returned by the image forming apparatus, the repeat process comprising:
        transmitting the reply request to the image forming apparatus; and
        determining whether the first user information stored in the storage is in the particular relationship with the second user information returned by the image forming apparatus.

4. The information processing apparatus according to claim 3,
    wherein the controller is further configured to stop the repeat process after a lapse of a reference period of time during which the repeat process is being performed, since a beginning of the repeat process.

5. The information processing apparatus according to claim 3,
    wherein the controller is further configured to stop the repeat process after a lapse of a predetermined period of time since acceptance of the image forming instruction.

6. The information processing apparatus according to claim 1,
    wherein the controller is further configured to, when the second user information is not returned by the image forming apparatus even after a lapse of a particular period of time since transmission of the reply request, again transmit the reply request to the image forming apparatus via the communication unit.

7. The information processing apparatus according to claim 1,
wherein the controller is further configured to:
accept a cancel instruction via the operation unit; and
when accepting the cancel instruction before transmission of the image data corresponding to the image forming instruction, cancel transmission of the image data.

8. The information processing apparatus according to claim 1,
wherein the controller is further configured to:
accept a setting instruction via the operation unit, the setting instruction specifying a setting regarding which one of a regular image forming operation and a confidential image forming operation is set to be performed, the regular image forming operation being an image forming operation in which the controller transmits the image data identified by the image data identification information to the image forming apparatus in response to acceptance of the image forming instruction, the confidential image forming operation being an image forming operation in which the controller transmits the reply request to the image forming apparatus in response to acceptance of the image forming instruction;
in response to acceptance of the setting instruction, store into the storage the setting specified by the setting instruction regarding which one of the regular image forming operation and the confidential image forming operation is set to be performed;
in response to accepting the image forming instruction when the setting stored in the storage specifies that the confidential image forming operation is set to be performed, transmit the reply request to the image forming apparatus via the communication unit; and
in response to accepting the image forming instruction when the setting stored in the storage specifies that the regular image forming operation is set to be performed, transmit the image data to the image forming apparatus via the communication unit, without transmitting the reply request.

9. The information processing apparatus according to claim 8,
wherein the controller is further configured to:
accept the setting information when accepting, via the operation unit, user information coincident with registered user information; and
not accept the setting information when not accepting, via the operation unit, user information coincident with the registered user information.

10. An image forming system comprising:
an information processing apparatus; and
an image forming apparatus,
the information processing apparatus comprising:
an operation unit;
a storage;
a communication unit configured to communicate with an image forming apparatus; and
a controller configured to:
accept, via the operation unit, image data identification information, an image forming instruction, and first user information, the image data identification information identifying image data to be image-formed, the image forming instruction being an instruction to cause the image forming apparatus to perform an image forming operation based on the image data;
store, into the storage, the image data identification information, the image forming instruction, and the first user information;
in response to acceptance of the image data identification information, the image forming instruction, and the first user information, transmit a reply request to the image forming apparatus via the communication unit, the reply request requesting the image forming apparatus to return second user information to the information processing apparatus, the second user information being returned to the information processing apparatus after a user identified by the second user information successfully logs in to the image forming apparatus;
after transmission of the reply request, in response to receipt of the second user information returned by the image forming apparatus, determine whether the first user information stored in the storage is in a particular relationship with the second user information returned by the image forming apparatus;
after receipt of the second user information returned by the image forming apparatus, when determining that the first user information is in the particular relationship with the second user information, transmit the image data identified by the image data identification information to the image forming apparatus via the communication unit; and
when determining that the first user information is not in the particular relationship with the second user information, not transmit the image data identified by the image data identification information to the image forming apparatus via the communication unit,
the image forming apparatus comprising:
an image forming unit;
an image-forming-apparatus-side communication unit;
an image-forming-apparatus-side operation unit; and
an image-forming-apparatus-side controller configured to:
in response to receiving the reply request via the image-forming-apparatus-side communication unit, return the second user information accepted via the image-forming-apparatus-side operation unit, to the information processing apparatus via the image-forming-apparatus-side communication unit;
when receiving the image data that corresponds to the second user information returned in response to the reply request, via the image-forming-apparatus-side communication unit, control the image forming unit to perform the image forming operation based on the received image data; and
when receiving the image data that does not correspond to the second user information returned in response to the reply request, via the image-forming-apparatus-side communication unit, control the image forming unit not to perform the image forming operation based on the received image data;
wherein the controller is further configured to:

be on standby in a logoff state where the controller is
allowed to accept login information via the operation
unit, the login information including the first user
information;
while being on standby in the logoff state, accept the
login information including the first user information
via the operation unit;
perform a login process comprising:
when the accepted login information satisfies a particular condition, switching from the logoff state
to a login state where the controller is allowed to
accept the image forming instruction via the
operation unit; and
when the accepted login information does not satisfy
the particular condition, maintaining the logoff
state; and
when accepting the image forming instruction after
switching to the login state, use the first user information included in the login information, as user
information identifying a user who is logging in to
the information processing apparatus.

11. The image forming system according to claim 10,
wherein the controller of the information processing apparatus is further configured to transmit the image data
and the first user information in association with each
other to the image forming apparatus via the communication unit, and
wherein the image-forming-apparatus-side controller is
further configured to:
when receiving the image data via the image-forming-apparatus-side communication unit, determine
whether the second user information returned to the
information processing apparatus is coincident with
the first user information associated to the image
data;
when determining that the second user information
returned to the information processing apparatus is
coincident with the first user information associated
with the image data, control the image forming unit
to perform the image forming operation based on the
image data; and
when determining that the second user information
returned to the information processing apparatus is
not coincident with the first user information associated with the image data, control the image forming unit not to perform the image forming operation
based on the image data.

12. The image forming system according to claim 10,
wherein the image-forming-apparatus-side controller is
further configured to:
when accepting the second user information via the
image-forming-apparatus-side operation unit, switch
to a login state where the image-forming-apparatus-side controller is allowed to perform a process corresponding to the second user information; and
maintain the login state where a user identified by the
second user information is logging in to the image
forming apparatus, during a period of time from
when the second user information is returned to the
information processing apparatus to when the image
forming unit completes the image forming operation
based on the image data corresponding to the second
user information.

13. A non-transitory computer-readable medium storing
computer-readable instructions that are executable by one or
more processors coupled with an information processing
apparatus, the information processing apparatus comprising
an operation unit, a storage, and a communication unit
configured to communicate with an image forming apparatus, the instructions being configured to, when executed by
the one or more processors, cause the one or more processors to:
accept, via the operation unit, image data identification
information, an image forming instruction, and first
user information, the image data identification information identifying image data to be image-formed, the
image forming instruction being an instruction to cause
the image forming apparatus to perform an image
forming operation based on the image data;
store, into the storage, the image data identification information, the image forming instruction, and the first user
information;
in response to acceptance of the image data identification
information, the image forming instruction, and the first
user information, transmit a reply request to the image
forming apparatus via the communication unit, the
reply request requesting the image forming apparatus to
return second user information to the information processing apparatus, the second user information being
returned to the information processing apparatus after a
user identified by the second user information successfully logs in to the image forming apparatus;
after transmission of the reply request, in response to
receipt of the second user information returned by the
image forming apparatus, determine whether the first
user information stored in the storage is in a particular
relationship with the second user information returned
by the image forming apparatus;
after receipt of the second user information returned by
the image forming apparatus, when determining that
the first user information is in the particular relationship
with the second user information, transmit the image
data identified by the image data identification information to the image forming apparatus via the communication unit; and
when determining that the first user information is not in
the particular relationship with the second user information, not transmit the image data identified by the
image data identification information to the image
forming apparatus via the communication unit;
wherein the instructions are further configured to, when
executed by the one or more processors, cause the one
or more processors to:
be on standby in a logoff state where the controller is
allowed to accept login information via the operation
unit, the login information including the first user
information;
while being on standby in the logoff state, accept the
login information including the first user information
via the operation unit;
perform a login process comprising:
when the accepted login information satisfies a particular condition, switching from the logoff state
to a login state where the controller is allowed to
accept the image forming instruction via the
operation unit; and
when the accepted login information does not satisfy
the particular condition, maintaining the logoff
state; and
when accepting the image forming instruction after
switching to the login state, use the first user information included in the login information, as user
information identifying a user who is logging in to
the information processing apparatus.

14. The non-transitory computer-readable medium according to claim 13,
wherein the instructions are further configured to, when executed by the one or more processors, cause the one or more processors to:
accept, via the operation unit, the image forming instruction individually from each of a plurality of users; and
each time accepting the image forming instruction from each individual user, accept the image data identification information and the first user information of each individual user, and register the image information instruction, the image data identification information, and the first user information in association with each other, in an image formation queue stored in the storage.

15. The non-transitory computer-readable medium according to claim 13,
wherein the instructions are further configured to, when executed by the one or more processors, cause the one or more processors to, when the second user information is not returned by the image forming apparatus even after a lapse of a particular period of time since transmission of the reply request, again transmit the reply request to the image forming apparatus via the communication unit.

16. The non-transitory computer-readable medium according to claim 13,
wherein the instructions are further configured to, when executed by the one or more processors, cause the one or more processors to:
accept a cancel instruction via the operation unit; and
when accepting the cancel instruction before transmission of the image data corresponding to the image forming instruction, cancel transmission of the image data.

17. The non-transitory computer-readable medium according to claim 13,
wherein the instructions are further configured to, when executed by the one or more processors, cause the one or more processors to repeatedly perform a repeat process while a repeat condition is satisfied, the repeat condition comprising determining that the first user information is not in the particular relationship with the second user information returned by the image forming apparatus, the repeat process comprising:
transmitting the reply request to the image forming apparatus; and
determining whether the first user information stored in the storage is in the particular relationship with the second user information returned by the image forming apparatus.

18. The non-transitory computer-readable medium according to claim 17,
wherein the instructions are further configured to, when executed by the one or more processors, cause the one or more processors to stop the repeat process after a lapse of a reference period of time during which the repeat process is being performed, since a beginning of the repeat process.

19. The non-transitory computer-readable medium according to claim 17,
wherein the instructions are further configured to, when executed by the one or more processors, cause the one or more processors to stop the repeat process after a lapse of a predetermined period of time since acceptance of the image forming instruction.

20. A non-transitory computer-readable medium storing computer-readable instructions that are executable by one or more processors coupled with an information processing apparatus, the information processing apparatus comprising an operation unit, a storage, and a communication unit configured to communicate with an image forming apparatus, the instructions being configured to, when executed by the one or more processors, cause the one or more processors to:
accept, via the operation unit, image data identification information, an image forming instruction, and first user information, the image data identification information identifying image data to be image-formed, the image forming instruction being an instruction to cause the image forming apparatus to perform an image forming operation based on the image data;
store, into the storage, the image data identification information, the image forming instruction, and the first user information;
in response to acceptance of the image data identification information, the image forming instruction, and the first user information, transmit a reply request to the image forming apparatus via the communication unit, the reply request requesting the image forming apparatus to return second user information to the information processing apparatus, the second user information being returned to the information processing apparatus after a user identified by the second user information successfully logs in to the image forming apparatus;
after transmission of the reply request, in response to receipt of the second user information returned by the image forming apparatus, determine whether the first user information stored in the storage is in a particular relationship with the second user information returned by the image forming apparatus;
after receipt of the second user information returned by the image forming apparatus, when determining that the first user information is in the particular relationship with the second user information, transmit the image data identified by the image data identification information to the image forming apparatus via the communication unit; and
when determining that the first user information is not in the particular relationship with the second user information, not transmit the image data identified by the image data identification information to the image forming apparatus via the communication unit,
wherein the instructions are further configured to, when executed by the one or more processors, cause the one or more processors to:
accept a setting instruction via the operation unit, the setting instruction specifying a setting regarding which one of a regular image forming operation and a confidential image forming operation is set to be performed, the regular image forming operation being an image forming operation in which the controller transmits the image data identified by the image data identification information to the image forming apparatus in response to acceptance of the image forming instruction, the confidential image forming operation being an image forming operation in which the controller transmits the reply request to the image forming apparatus in response to acceptance of the image forming instruction;
in response to acceptance of the setting instruction, store into the storage the setting specified by the setting instruction regarding which one of the regular image forming operation and the confidential image forming operation is set to be performed;

in response to accepting the image forming instruction when the setting stored in the storage specifies that the confidential image forming operation is set to be performed, transmit the reply request to the image forming apparatus via the communication unit; and in response to accepting the image forming instruction when the setting stored in the storage specifies that the regular image forming operation is set to be performed, transmit the image data to the image forming apparatus via the communication unit, without transmitting the reply request.

21. The non-transitory computer-readable medium according to claim 20, wherein the instructions are further configured to, when executed by the one or more processors, cause the one or more processors to:

accept the setting information when accepting, via the operation unit, user information coincident with registered user information; and not accept the setting information when not accepting, via the operation unit, user information coincident with the registered user information.

* * * * *